Oct. 16, 1928.
C. B. SMITH
1,688,026
BUMPER FOR MOTOR VEHICLES
Original Filed July 24, 1925
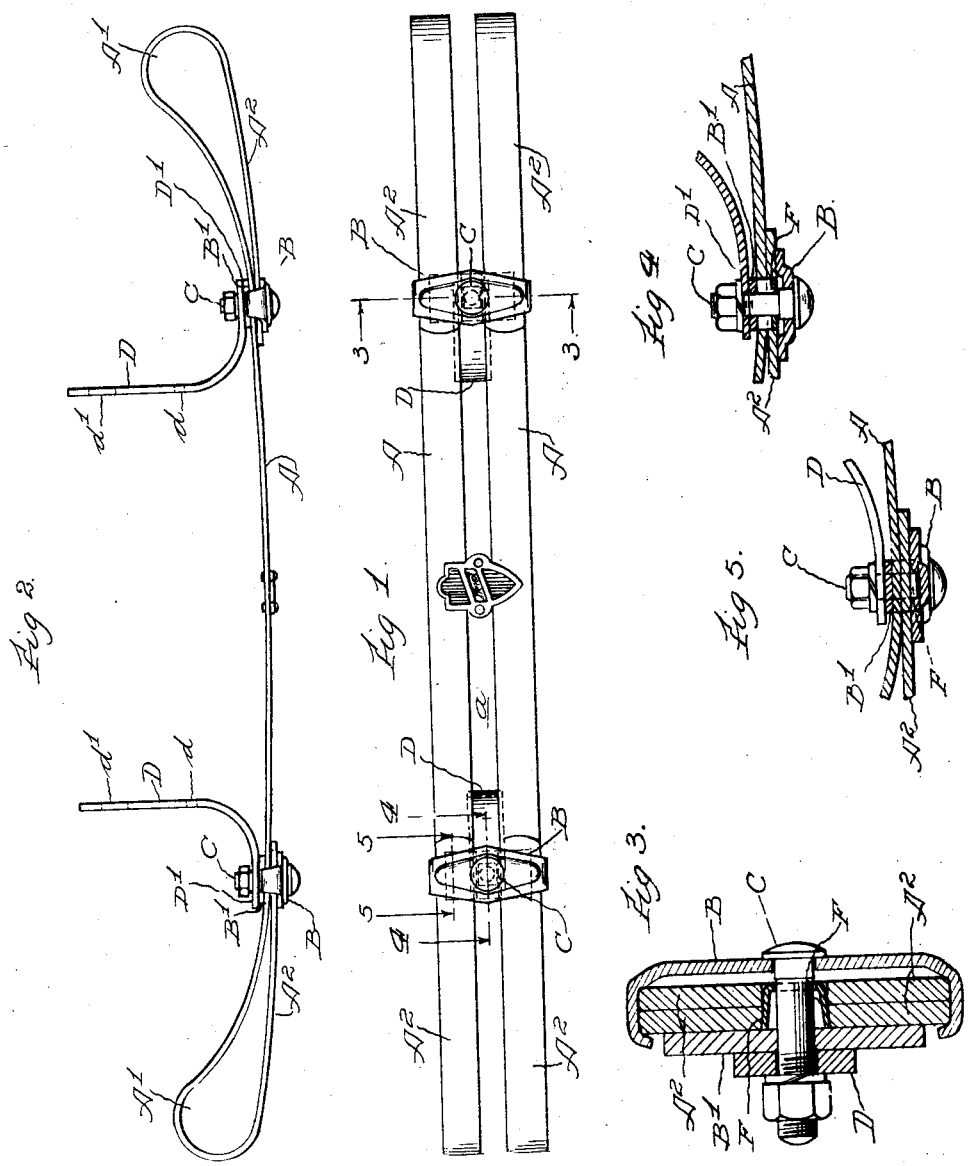
Inventor.
Charles B. Smith.
by Burton & Burton
his Attorneys.

Patented Oct. 16, 1928.

1,688,026

UNITED STATES PATENT OFFICE.

CHARLES B. SMITH, OF CHICAGO, ILLINOIS, ASSIGNOR TO STEWART-WARNER SPEED-OMETER CORPORATION, OF CHICAGO, ILLINOIS, A CORPORATION OF VIRGINIA.

BUMPER FOR MOTOR VEHICLES.

Application filed July 24, 1925, Serial No. 45,733. Renewed October 1, 1927.

The purpose of this invention is to provide an improved construction of a bumper for automobiles. It consists in the elements and features of construction shown and described, and indicated in the claims.

In the drawings:

Figure 1 is a front elevation of a bumper embodying this invention.

Figure 2 is a plan view of the same.

Figure 3 is a section at the line, 3—3, on Figure 1.

Figure 4 is a section at the line, 4—4, on Figure 1.

Figure 5 is a section at the line, 5—5, on Figure 1.

The drawings show a bumper having its impact member comprising two impact bars, set edgewise in the same vertical plane and spaced apart a short distance in that plane and secured together by clamps crossing both impact bars at a distance from the opposite ends respectively, said impact bars each having their opposite end portions reflexed forwardly and inwardly and lapped upon the body of the bar at a substantial distance from the middle point of the length of the impact bars and a substantial distance also from the bends of the loops formed by such reflexing of the end portions, the said reflexed and lapped ends being secured in lapped position by the clamps mentioned which connect the two bars rigidly together. In the construction shown the impact member comprising these two parallel vertically edgewise vertically spaced bars having loop ends, is mounted upon the vehicle by means of supporting members formed of flat metal bar, substantially like the impact bars, said supporting members being adapted to be secured at their rear ends to the side bars of the vehicle frame, and being flexed outwardly in a curve of substantially 90 degrees for lapping the outer ends upon the clamps which secure the bars of the impact member together, as described, and being secured to said clamps for carrying the impact member bodily.

A, A, are the impact bars, upper and lower,—having their end portions flexed forwardly and inwardly, forming in each bar at each end thereof a loop, $A^1$, the inwardly extending end portion, $A^2$, of each bar being lapped upon the forward side of the body of the same bar and engaged under the forward member, B, of the clamp which comprises said forward member, B, and the cooperating rear member, $B^1$, between which the body and said lapped ends of the two bars are embraced and securely clamped by means of the bolt, C, extending through the two clamp members in the vertical interspace, between the two bars which is determined by spacers, F, engaged by the bolt. The rear clamp member, $B^1$, is lapped at its rear side by the outwardly projecting forward end, $D^1$, of the support bar, D, curved in an arc of 90 degrees, as mentioned, for extending its rear end portion rearwardly for lapping and being secured to the side bar of the vehicle frame, as indicated by the apertures, $d$, $d^1$, adapted to receive securing bolts and the like.

The purposes of the formation of the impact bars as described with outwardly-projecting loop ends formed by forward and inward flexure of the end portions of the bar, as described, are:—first, and most obviously to adapt said projecting ends of the impact member to yield either forwardly or rearwardly and by virtue of the rounded ends of the loop, slip clear of any obstruction which may be encountered at either side,—front or rear. Second,—and more importantly,—in conjunction with the clamping of the forwardly lapped ends on the forward face of the body, by means of the clamp which serves for mounting the impact member as a whole on the support to which the clamp is positively secured, to adapt the construction as a whole to operate for yieldingly resisting the sliding of the clamp outwardly along the impact bars when the bumper encounters an obstacle at the middle portion,—that is, between the points of mounting upon the supporting arms, which by flexing rearwardly the middle portion of the bar, compels either the drawing together of the supporting arms, D, or the slipping and sliding of the clamps outwardly along the impact bars or, as in fact will ordinarily happen, partial drawing together of the supporting arms and partial slipping and sliding of the clamps outwardly along the impact bars. The resistance to the sliding is a very important element in the total function of a bumper, which is to absorb as much as possible of the shock of impact during a limited continuous advance movement of the vehicle against the obstacle. The yieldingness of the impact bars and the supporting arms due to their elasticity, serves this purpose to a limited extent, depending upon the relative stiffness of the elements of the bumper,—both the impact bars and the support,—and the weight and consequent momentum of the vehicle. But the range of yielding movement possible is very limited unless the bumper is mounted protruding an undesirable distance in front of the car; and also the degree of flexure of which the parts of the bumper are susceptible for such yielding movement is quite limited. But the yielding movement which can be accommodated by the sliding of the clamps on the impact bar without destructive flexure of the supporting arms or impact bars is easily made as great as the total distance which can be conveniently allowed between the impact bar and the parts of the vehicle in the rear thereof. Any means, therefore, by which the yielding resistance to the sliding of the clamps on the impact bars can be increased beyond the normal friction of the parts when clamped to a given degree of tightness by the bolts which secure the clamp members to the supporting arms, contributes substantially to the capacity of the bumper as a whole to absorb the shock of impact.

Considering the construction shown, and noting that the forwardly lapped ends of the impact bars and the portion of the body of the bar upon which they are thus lapped diverge outwardly,—that is, from the embrace of the clamp to the loop,—it will be seen that resistance to the sliding of the clamp outwardly will increase as it moves outwardly by the wedging effect of the diverging lapped parts of the impact bar, which, as a whole, must be driven as a wedge between the two members of the clamp in order that the clamp may slide outwardly. This wedging effect, it will be noticed, is in part due to the slight rearward flexure of the impact bar which normally results from the formation of the loop, and in part to the forward trend of the lapped forward end of the loop from the point of engagement by the clamp to the loop which also results normally from the formation of the loop. Both elements of this wedging effect will be obtained in the sliding of the clamp if it slides upon both the lapped and clamped parts; but if, as may happen in the absence of any preventive expedient, for forwardly lapped end is carried with the clamp in its sliding movement, there will be substituted the friction of this lapped end on the body of the bar, for the friction of the clamp on the lapped end; and there will be lost the value of the wedging which is dependent upon the forward divergence of the lapped end from the body of the impact bar. But under these circumstances, there will be an addition to the resistance to the outward sliding of the clamp, due to the expansion of the loop, and probable shifting of its apex, which will result from the sliding of the lapped end on the body of the bar.

I claim:—

1. A bumper for motor vehicles comprising a plurality of flat spring impact bars mounted edgewise in the same vertical plane and slightly spaced apart in that plane, each bar having its opposite end portions looped by being flexed outwardly and then toward each other and lapped against the impact side of the bar; clamps applied across the spaced bars at the lap of the loop ends thereon for securing the bars rigidly together in spaced relation and securing the lapped ends on the bars respectively; spring bar supports each secured to the vehicle frame structure and terminating outwardly in a horizontal curve, and bolts securing the clamps of the impact member to the outer ends of said spring bar supports proximate to said horizontal curves thereof.

2. In the construction defined in claim 1, foregoing, the bolts for securing the clamps to the supports being the means for clamping said clamps for securing the parallel impact bars together and the loop ends lapped thereon.

3. In the construction defined in claim 1, foregoing, the clamp-securing bolts being extended through the interspace between the vertically spaced impact bars for connecting the clamp members and for engaging the horizontally curved spring bar support.

4. In the construction defined in claim 1, foregoing, the end loop of each bar being formed with the two sides of the loop diverging, from the lapped area embraced by the clamp, whereby sliding of the loop toward the middle of the bumper through the clamp tends to increase the grip of the clamps by the wedging action of the diverging loop sides.

5. A bumper for motor vehicles comprising an impact member consisting of a plurality of flat spring impact bars mounted edgewise in the same vertical plane and spaced apart in that plane, each bar having its opposite end portions looped by being flexed outwardly and then toward each other and lapped against the impact side of the bars; clamps applied across the spaced bars at the lap of the loop ends thereon for clamping the lapped ends against the body of the bars, respectively, and securing the two bars rigidly together in spaced relation, and resilient supports for the impact member attached to the vehicle frame structure and to said clamps respectively.

6. In a bumper for motor vehicles comprising an impact member consisting of a plurality of flat spring impact bars mounted edgewise vertically one above the other and spaced apart vertically, each bar having its opposite end portions looped by being flexed outwardly and then toward each other and lapped against the impact side of the bar; clamps applied across the spaced bars at the lap of the loop ends thereon for clamping the lapped ends against the body of the bars respectively and securing the two bars rigidly together in spaced relation; and resilient supports for such impact member attached thereto and extending for attachment to the vehicle frame structure.

7. A bumper for motor vehicles comprising a plurality of flat spring impact bars mounted one above the other and spaced apart vertically, each bar having its opposite end portions looped by being flexed outwardly and then toward each other and lapped against the impact surface of the bar; clamps applied across the spaced bars at the lap of the loop ends thereon, and spring bar supporting means attached to the inner portions of the end loops intermediate their extreme outer ends and the said clamps.

8. In a bumper for motor vehicles, an impact member comprising a flat spring bar mounted edgewise and having its opposite end portions looped by being flexed outwardly and then toward each other and lapped against the impact side of the bar with clamping means applied at the lap of the loop ends on the bar for closing the loops.

In testimony whereof, I have hereunto set my hand at Chicago, Illinois, this 15th day of July, 1925.

CHARLES B. SMITH.